Patented Apr. 26, 1949

2,468,208

UNITED STATES PATENT OFFICE 2,468,208

BROMINE-CONTAINING ORGANIC COMPOUNDS

Morris S. Kharasch, Chicago, Ill., assignor to United States Rubber Company, New York, N. Y., a corporation of New Jersey No Drawing. Application September 13, 1946, Serial No. 696,941

2 Claims. (Cl. 260—651)

This application is a continuation-in-part of my application Serial No. 638,911, filed January 3, 1946.

This invention relates to improvements in the production of bromine-containing organic compounds and to the resulting products, and more especially is concerned with the addition of bromomethanes containing at least three halogen atoms to mono-olefines, diolefines (conjugated as well as non-conjugated), or acetylenic compounds and to form certain bromine-containing organic compounds. The said bromomethanes correspond to the formula

where X is either chlorine, bromine or fluorine; and Y is either chlorine, bromine, fluorine or hydrogen. Among such bromomethanes containing at least three halogen atoms are: $CBr_4$, $CBr_3H$, $CBr_2ClH$, $CBrCl_2H$, $CBr_3Cl$, $CBr_2Cl_2$, $CBrCl_3$, $CBr_2F_2$, $CBrF_3$, $CBr_3F$.

More particularly, this invention relates to the addition of trichlorobromomethane to organic compounds containing olefinic and/or acetylenic unsaturation to form compounds containing four halogen atoms in each molecule and having the type formulae

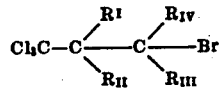

or

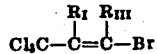

wherein $R_I$, $R_{II}$, $R_{III}$, and $R_{IV}$ are any radicals (atoms or atom groupings) connected to carbon atoms by single valence bonds.

One of the problems in this art is to manufacture low molecular compounds containing a trichloromethyl group attached to one carbon atom and a halogen atom attached to a different carbon atom, and more particularly where the latter carbon atom is an adjacent carbon atom to the first mentioned carbon atom. A further problem is to provide a chemical which will add to any olefinic and/or acetylenic compound to give, predominantly, compounds wherein a trichloromethyl group is attached to one carbon atom and a bromine atom is attached to a carbon atom adjacent to the first mentioned carbon atom; carbon tetrachloride does not so add to many unsaturated compounds, i. e., styrene, butadiene, hexyne-1, allyl chloride, etc., to yield the one-to-one addition products.

I have found that trichlorobromomethane is such a chemical. It exhibits toward compounds containing carbon-to-carbon unsaturation an unexpected reactivity which is not shown by the chemically similar carbon tetrachloride. For example, trichlorobromomethane will under the conditions herein disclosed add readily to any organic compound containing carbon-to-carbon unsaturation to give compounds containing three chlorine atoms attached to a carbon atom, which carbon atom is attached to one of the carbon atoms which constituted part of the >C=C< or —C≡C— group and containing one bromine atom attached to the other carbon atom which constituted part of the essential >C=C< or —C≡C— group, and which compounds (i. e., those formed by the addition of the trichlorobromomethane to the unsaturated compound) contain no more than one molecular unit of the compound which contained the essential >C=C< or —C≡C— group. That is to say, that trichlorobromomethane adds readily to olefines and acetylenes to form simple one-to-one adducts. This reaction takes place readily with unsaturated compounds which either do not undergo the analogous reaction with carbon tetrachloride at all or which if they do undergo the reaction give large yields of polymeric products accompanied by little or none of the desired one-to-one products.

Unlike $CCl_4$, trichlorobromomethane adds readily to all compounds containing carbon-to-carbon unsaturation, whether it be olefinic and/or acetylenic in nature, to give almost exclusively the one-to-one product.

For instance, when one attempts to prepare, by the free radical catalyzed addition of carbon tetrachloride to styrene, the compound 1,1,1,3-tetrachloro-3-phenylpropane, one obtains instead a polymer of styrene containing some chlorine. With trichlorobromomethane, however, one obtains by the same method an almost quantitative yield of 1,1,1-trichloro-3-bromo-3-phenylpropane and no polymeric product.

The new compound 1,1,1-trichloro-3-bromo-3-phenylpropane can be readily dehydrobrominated to yield the new compound 1,1,1-trichloro-3-phenyl-2-propene which compound can be readily hydrolyzed to yield cinnamic acid, or the dehydrobromination and hydrolysis may be combined in one step to yield cinnamic acid directly from the 1,1,1-trichloro-3-bromo-3-phenylpropane.

Moreover, trichlorobromomethane adds readily to conjugated dienes such as butadiene, isoprene, and piperylene (1,3-pentadiene) to form almost exclusively one-to-one products under conditions wherein carbon tetrachloride would form predominantly polymeric products.

Even with those olefinic compounds which can be made to react with carbon tetrachloride to give substantial yields of one-to-one products, the vastly greater reactivity of the trichlorobromomethane is apparent in that with the latter compound one obtains almost exclusively one-to-one products even when the olefinic compound and the halogenated methane are present in substantially equimolar proportions. With carbon tetrachloride on the other hand, it is usually necessary to use for each molecular weight of the olefinic compound a large molecular excess of the carbon tetrachloride (in proportion of 6 or 10 to 1) if any substantial yield of the one-to-one product is to be obtained.

A further distinction between the behavior of trichlorobromomethane and the chemically similar carbon tetrachloride in the herein described reaction, lies in the ease with which trichlorobromomethane adds to non-terminal olefinic bonds, such as in pentene-2 and octene-2, which with $CCl_4$ give very poor yields of the addition products.

Thus, it is apparent that under the herein disclosed conditions, trichlorobromomethane adds readily to all those unsaturated organic compounds to which carbon tetrachloride can add, to give higher yields of one-to-one products than can be obtained from using carbon tetrachloride. Furthermore, trichlorobromomethane adds readily under the same conditions to unsaturated compounds to which carbon tetrachloride does not seem to add. For instance, trichlorobromomethane can be made to add readily to acetylenic compounds such as acetylene, phenyl acetylene, and hexyne-1, to give one-to-one products. Carbon tetrachloride does not add to these compounds.

In those cases wherein one-to-one products can be obtained by adding either trichlorobromomethane or carbon tetrachloride to olefinic compounds, the products formed using trichlorobromomethane are generally the more useful. Both types of compounds contain a trichloromethyl group attached to one carbon atom but the product derived from trichlorobromomethane contains a bromine rather than a chlorine atom attached to another carbon atom. By virtue of the greater reactivity of this substituent bromine atom, as compared to a chlorine atom, the one-to-one products derived from trichlorobromomethane are more useful as chemical intermediates than are the corresponding products derived from carbon tetrachloride. For instance, when one attempts to obtain the desired unsaturated compound $CH_2=CH—CCl_3$ by dehydrohalogenation of $ClCH_2CH_2CCl_3$, which is the 1:1 addition product of carbon tetrachloride and ethylene, one usually obtains a mixture containing the desired product together with a large porportion of $CH_2ClCH=CCl_2$. With $BrCH_2CH_2CCl_3$, which is the one-to-one addition product of trichlorobromomethane and ethylene, this is not the case and dehydrohalogenation leads to a quantitative yield of $CH_2=CHCCl_3$.

Thus, the unique behavior of trichlorobromomethane toward unsaturated compounds as compared to carbon tetrachloride may be summarized as follows:

(a) Trichlorobromomethane reacts more readily with compounds containing carbon-to-carbon unsaturation than does carbon tetrachloride.

(b) The addition of trichlorobromomethane to such unsaturated compounds can be brought about by ordinary visible light, whereas the corresponding reaction with carbon tetrachloride requires ultra violet light.

(c) Smaller amounts, and in some cases negligible amounts, of catalyst are required to bring about the addition of trichlorobromomethane to such unsaturated compounds.

(d) Trichlorobromomethane unlike carbon tetrachloride readily forms one-to-one products with all olefinic compounds with which it reacts.

(e) Trichlorobromomethane unlike carbon tetrachloride adds readily to acetylenic compounds, butadiene, styrene, allylchloride to yield a one-to-one addition product.

Trichlorobromomethane is uniquely distinguished from the other bromomethanes containing at least three halogen atoms in that when it adds to an olefinic or acetylenic bond, it always forms adducts in which a trichloro methyl group, i. e., a $CCl_3$ group, is attached to one carbon atom and a bromine atom is attached to another carbon atom. None of the other bromomethanes such as for example $CBr_4$ can give this result.

The compound $CCl_2BrH$ (mono-bromodichloromethane) adds readily to simple aliphatic olefines to form simple one-to-one adducts which on hydrolysis yield unsaturated aldehydes. Mono-bromodichloromethane does not add to styrene to form a one-to-one adduct. Trichlorobromomethane is distinguished in its behavior from mono-bromodichloromethane in that the adducts of trichlorobromomethane on hydrolysis yield unsaturated acids and by the fact that trichlorobromomethane readily forms a one-to-one adduct with styrene.

In accordance with the present invention, a bromomethane containing at least three halogen atoms such as, for example, trichlorobromomethane, is caused to react with an olefinic compound of the type

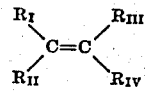

to give a chlorine-containing organic bromine compound. The desired reaction may be brought about either by heating the reaction mixture containing trichlorobromomethane and the olefinic organic compound and a promoter, or by irradiating such a mixture with actinic light. Suitable catalysts or promoters may be employed to increase the rate of the reaction or to increase the yield of products. Suitable catalysts are the peroxy polymerization catalysts such as the diacyl peroxides, e. g., dibenzoyl peroxide, diacetyl peroxide, dipropenyl peroxide, etc.; organic hydroperoxides, e. g., tert.-butyl hydroperoxide; ascaridole. Other catalysts which may be employed are finely divided magnesium, particularly in the presence of a trace of iodine, or other active metal such as Raney nickel, particularly in the presence of a trace of iodine. In the absence of added catalysts freshly prepared trichlorobromomethane does not react as rapidly with olefinic compounds as does trichlorobromomethane which has stood in contact with air for some time. This is believed to indicate the formation of per-oxy catalysts in the trichlorobromomethane. The reaction between trichlorobromomethane and olefines may also be initiated by actinic light in which case ordinary visible light is suitable.

The reaction mixture may contain an inert or relatively inert diluent, if desired. The relative amounts of the reactive components of the reaction mixture are not critical, although it is preferred to have more than one molecular weight of trichlorobromomethane present for each molecular weight of the other reactive component, e. g., one and one-half to two mols.

The temperature at which the reaction is carried out is not critical except that in the case in which a diacyl peroxide is the catalyst, the temperature must be high enough to decompose the diacyl peroxide, and as in most chemical reactions an increase in the reaction temperature will result in an increase in the speed of the reaction. In general, temperatures between room temperature (20° C.) and about 150° C. are preferred.

Halogenated methanes, containing at least one bromine atom, all exhibit a high degree of selectivity in reacting with olefines, as disclosed herein, to form predominantly, products containing one mole of the olefine to one mole of the halogenated methane. In this respect the bromo halogenated methanes differ markedly from the halogenated methanes containing only chlorine or fluorine, which with certain aliphatic olefines give appreciable quantities of polymeric products, and with substituted aliphatic olefines such as styrene give almost exclusively polymeric products (namely, those containing 2, 3 or more moles of the olefine to one mole of the carbon tetrachloride).

The products formed by the addition of $CCl_3Br$ to an olefinic compound contain the characteristic group $—CCl_3$.

As one of the essential reactive components of the reaction mixture, I may use any organic compound containing olefinic or acetylenic unsaturation. By a compound containing olefinic unsaturation, I mean any compound containing the essential grouping $>C=C<$ which grouping, if present as part of a carbocyclic structure, is not conjugated with respect to any other double bond within the same carbocyclic structure because I have found that compounds such as benzene, toluene, naphthalene, etc., which contain only aromatic unsaturation, do not participate in the reaction as herein disclosed and may in fact be used as inert diluents.

Thus, the olefinic compounds suitable for use in the practice of the present invention may be generalized as comprising those having the type formula

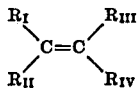

wherein $R_I$, $R_{II}$, $R_{III}$, and $R_{IV}$ are any radicals (atoms or atom groupings) connected to the carbon atoms of the essential grouping $>C=C<$ by single bonds and in which any two of the R's may be interconnected to form a non-aromatic ring. I have found that it is not necessary that the essential grouping for $>C=C<$ be represented as terminal $CH_2=C<$. Compounds such as butene-2, pentene-2, octene-2, oleic acid and esters thereof, such as alkyl oleates, and others in which the olefinic group is not terminal, may be caused to undergo the reaction which is the subject of the present invention. It is true, however, that those compounds having the type formula

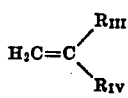

will react more readily, than will those in which the $>C=C<$ group is not terminal, with the bromomethanes containing at least three halogen atoms and are therefore preferred. Among such olefinic compounds containing a terminal $>C=C<$ group are the following: propene, butene-1, pentene-1, hexene-1, heptene-1, octene-1, etc.; or both $R_{III}$ and $R_{IV}$ may be alkyl radicals as in, e. g., isobutylene, 2-methyl butene-1, 2-methyl pentene-1, 2-methyl hexene-1, etc.; $R_{III}$ may be a cyclic saturated radical such as in vinylcyclohexene, etc.; $R_{III}$ may be an aryl radical as in, e. g., styrene, alpha-methyl styrene, vinyl naphthalene, etc.; $R_{III}$ may be a substituted alkyl radical as in allyl acetate, methallyl acetate, allyl chloride, methallyl chloride, undecylenic acid, vinyl acetic acid, allyl ethyl ether, methallyl ethyl ether, etc.; $R_{III}$ may be halogen as in vinyl chloride; or $R_{III}$ and $R_{IV}$ may be halogen as in vinylidene chloride. Other olefinic compounds which react readily with $CCl_3Br$ under the conditions of the present invention are: diallyl, chlorostyrene, diallyl ether, methyl vinyl carbinol, methyl acrylate, dimethallyl, divinyl benzene, vinyl cyclohexene, 1,3-pentadiene, acrolein, crotonic acid, crotonic esters.

Acetylenic compounds such as acetylene, hexyne-1, and phenyl acetylene, also add $CCl_3Br$ under the conditions of the present invention. In addition, acetylenic compounds containing non-terminal triple bonds such as $C_6H_5C≡C—CH_3$ will add bromotrichloromethane. This is in contradistinction to the behavior of $CCl_4$ which it has been observed either does not add to compounds containing only acetylenic unsaturation or forms only traces of addition products.

While I do not wish to be bound to any particular theory, the reactions described herein are best interpreted on the basis of a free radical chain reaction initiated by the free radicals formed photochemically, thermally, or by the decomposition of a per-oxy compound promoter. For purposes of illustration, the reactions involving, for example, the addition of $CCl_3Br$ to an olefine may be explained on the basis of the following scheme:

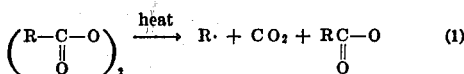

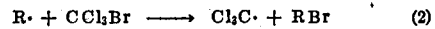

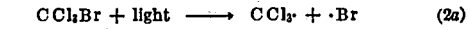

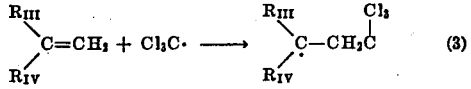

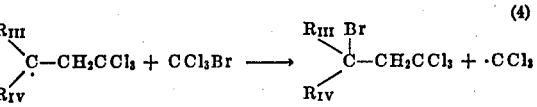

Steps 1 and 2 together illustrate the primary generation of free trichloromethyl radicals by the decomposition of a diacyl peroxide within a mixture containing as one reactive component $CCl_3Br$. The free radical chain consists of the repetition of the cycle indicated by reactions 3 and 4 in which step 4 may be considered as representing the secondary generation of free trichloromethyl radicals which are effective in carrying on the reaction.

Steps 2a and 2b illustrate alternative primary sources of free trichloromethyl radicals. Step 2a illustrates the photochemical generation of free trichloromethyl radicals by the irradiation of trichlorobromomethane with actinic light and step 2b illustrates the possible thermal generation of the free trichloromethyl radicals from trichlorobromomethane. Step 2b could be responsible for the uncatalyzed addition of trichlorobromomethane to olefines.

The following examples are for purposes of illustration only:

EXAMPLE 1.—THE REACTION OF BROMOTRICHLORMETHANE WITH STYRENE IN THE PRESENCE OF ACETYL PEROXIDE

A solution containing styrene (12 g.), bromotrichloromethane (100 g.) and acetyl peroxide (2.3 g.) is heated at 60–70° C. for 4 hours in a reaction flask fitted with a reflux condenser. The reaction mixture is then distilled in a distillation apparatus with a 10 inch Vigreux column. Bromotrichloromethane (78 g.; B. P. 103–104° C.) distills first. Vacuum distillation of the residual oil yields a product (27 g.; 78% yield) which crystallizes upon standing to give white crystals (M. P. 54–55° C. after recrystallization from methanol). This substance is shown to be 1,1,1-trichloro-3-bromo-3-phenylpropane.

Analysis.—Calculated for $C_9H_8Cl_3Br$: Silver equivalent, 75.5. Found: Silver equivalent, 75.4.

A high boiling residue (5.8 g.) remains in the distilling flask.

In carrying out the above analysis, a weighed amount of the product is oxidized in the Parr bomb with $Na_2O_2$ in the conventional manner, and the amount of halide present as the sodium salt is determined by precipitating it as the silver salt. The silver equivalent of the substance is taken to be the weight of that substance which will react with one equivalent of silver. Thus, in the case of a tetrahalo compound, the calculated silver equivalent should be one-fourth the molecular weight. When the measured silver equivalent is equal to one-fourth of the molecular weight, as calculated for a one-to-one product, it provides evidence that the product is in fact a one-to-one product.

*Proof of structure of 1,1,1-trichloro-3-bromo-3-phenylpropane*

The carbon skeleton of this type of substance is proved by hydrolysis of the 1,1,1-trichloro-3-bromo-3-phenylpropane with hydrochloric acid containing cuprous chloride to give cinnamic acid.

Further, the following experiment proves that the bromine atom in the molecule is in the 3-position. A mixture of the styrene addition product (27 g.) and triethylamine (36 g.) is heated under reflux for 10 hours. During this period a crystalline solid precipitates. After the mixture has cooled, these crystals (17 g.) are collected on a filter. They are dissolved in water, the water solution boiled with a commercial grade of activated charcoal sold under the trade name "Norite" (1 g.), and the resulting mixture filtered. When the water-filtrate is evaporated, white crystals are obtained. These are triethylamine hydrobromide (M. P. 243–245° C. (unc.)).

Analysis.—Calculated for $C_6H_{16}NBr$: Silver equivalent, 182. Found: 174.

The liquid portion of the reaction mixture is washed three times with 10% sulfuric acid, once with water, and then with potassium carbonate solution (5%). The remaining oil is dried over anhydrous potassium carbonate. Two distillations of the product yield a colorless oil (11 g.; $n_D^{20}$ 1.5731; B. P. 93–95° C. at 0.3 mm.). It gives the correct chlorine analysis for 3,3,3-trichloro-1-phenylpropylene.

Analysis.—Calculated for $C_9H_7Cl_3$: Cl, 48.1. Found: 47.6.

EXAMPLE 2.—THE REACTION OF BROMOTRICHLOROMETHANE WITH VINYL ACETATE IN THE PRESENCE OF ACETYL PEROXIDE

A mixture containing vinyl acetate (22 g.), bromotrichloromethane (106 g.) and acetyl peroxide (1.5 g.) is heated for 3 hours at 50–60° C. Distillation of the reaction mixture yields unreacted bromotrichloromethane (B. P. 103–104° C.; 64.7 g.), and a higher boiling product shows by analysis to be the one-to-one addition product (56.3 g.; B. P. 55–60° C. at 0.5 mm.; $n_D^{20}$ 1.4969; 89.6% yield).

Analysis.—Calculated for $C_5H_6O_2Cl_3Br$: Silver equivalent 71.1. Found: 70.6.

Experimentation indicates that this addition product is 1-bromo-3,3,3-trichloropropyl acetate, since it undergoes the following chemical reactions:

The addition product (10 g.) is mixed with dilute sulfuric acid (5%; 100 ml.), and the mixture steam distilled. An oil heavier than water separates in the steam distillate. It is extracted with ether, and the ether solution washed once with water, with potassium carbonate solution (5%), and again with water. The ether extract is dried over anhydrous potassium carbonate.

After the ether is removed from the extract, an oil remains which distills at 85° C. at 35 mm. pressure. This product is identifiable as 3,3-dichloroacrolein; (Analysis.—Calculated for $C_3H_2OCl_2$: Cl, 56.8; found: 54.4), since it reacts with 2,4-dinitrophenyl hydrazine to form a chlorine-containing 2,4-dinitrophenyl hydrazone (M. P. 164–165° C.); (Analysis.—Calculated for $C_9H_6O_4N_4Cl_2$: Cl, 23.3; found: 22.8).

EXAMPLE 3.—THE REACTION OF BROMOTRICHLOROMETHANE WITH OCTENE-1 IN THE PRESENCE OF ACETYL PEROXIDE

A mixture of octene-1 (27.9 g.), bromotrichloromethane (116.7 g.), and acetyl peroxide (2.0 g.) is heated as described above at 60–70° C. for 4 hours. Then the reaction mixture is distilled without further treatment.

After the unreacted solvent has been removed, a high boiling oil remains which appears to be predominantly one product (55.0 g.; B. P. 99–102° C. at 0.6 mm.; $n_D^{20}$ 1.4943; residue in distillation flask weighs less than 0.5 g.). By analogy with the other products of this type of reaction in which structural studies have been made, this addition product is presumably 1,1,1-trichloro-3-bromononane; (Analysis.—Calculated for $C_9H_{16}Cl_3Br$: Silver equivalent 77.7; found: 78.6), since it undergoes the following reactions:

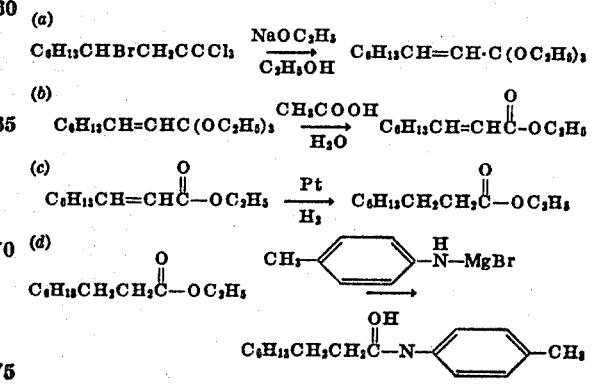

The melting point of this latter compound is 83–84° C., and it does not depress the melting point of an authentic sample of p-toluidide of pelargonic acid.

EXAMPLE 4.—THE REACTION OF BROMOTRICHLOROMETHANE WITH ETHYLENE IN THE PRESENCE OF ACETYL PEROXIDE

A solution containing bromotrichloromethane (134 g.) and acetyl peroxide (1.54 g.) is placed in a specially made, stainless steel bomb equipped with a thermometer well and a heating jacket attached to an ordinary Parr hydrogenation apparatus. After the system has been carefully swept with ethylene, a pressure of 45 lbs. of ethylene is maintained over the solution. Shaking is started and the bomb and its contents are slowly heated to 80° C. These conditions are maintained for 6 hours. Calculations from the drop in pressure in the apparatus indicates that about one-half of a mole of ethylene is consumed in the reaction.

After the unreacted solvent has been removed by distillation, the residue is distilled at 104 mm. A pure product (73.4 g.; B. P. 113–5–114° C.; $n_D^{20}$ 1.5127) distills.

*Analysis.*—Calculated for $C_3H_4Cl_3Br$: Silver equivalent, 56.6. Found: 57.0.

The formula of this product is presumably $BrCH_2CH_2CCl_3$.

Only about one-half gram of high boiling residue remains in the still pot following this distillation. Identical results are obtained using benzoyl peroxide as the catalyst.

EXAMPLE 5.—THE REACTION OF BROMOTRICHLOROMETHANE WITH ISOBUTYLENE IN THE PRESENCE OF ACETYL PEROXIDE

A mixture of bromotrichloromethane (126.2 g.) and acetyl peroxide (2.3 g.) is placed in the bomb of the Parr apparatus. The apparatus is swept carefully with isobutylene, and a quantity of isobutylene is forced into the bomb system. It dissolves completely (the pressure as measured by the gauge dropped to zero upon shaking). The bomb and its contents are warmed slowly to 60° C. At this temperature, a gauge pressure of 15 lbs. is reached. The reaction begins suddenly. The pressure drops to zero, and the temperature of the reaction mixture rises to 106° C. The heating jacket is turned off, and the temperature is allowed to fall to 90° C. Then the reaction temperature is maintained at 90° C. by carefully controlling the amount of isobutylene introduced into the bomb. The heat of reaction becomes less and less (it is possible to maintain a higher pressure of isobutylene without overheating), and finally, it becomes necessary to heat the bomb. A temperature of 80° C. and an isobutylene pressure of 25 lbs. is maintained for 3 hours to complete the reaction. No high boiling materials are formed in the reaction. The same materials may be obtained in somewhat lower yields when the above experiment is repeated leaving out the peroxide catalyst. The reaction between isobutylene and trichlorobromomethane may also be initiated by irradiation with actinic light.

The small amount of unreacted bromotrichloromethane is removed from the reaction product at reduced pressure, and the residue is distilled at 10 mm. A pure fraction (134 g.; $n_D^{20}$ 1.5108; B. P. 76–77° C. at 10 mm.) is obtained which is presumably 1,1,1-trichloro-3-bromo-3-methyl butane, (*Analysis.*—Calculated for $C_5H_8Cl_3Br$: Silver equivalent, 63.8; found: 63.8), since it undergoes the following reactions:

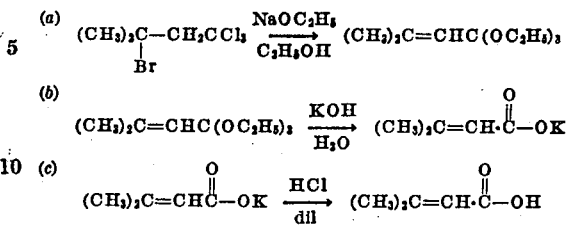

The melting point of the acid thus obtained is 69–70° C. and it does not depress the melting point of an authentic specimen of β,β-dimethyl acrylic acid.

EXAMPLE 6.—THE REACTION OF BROMOTRICHLOROMETHANE WITH BUTADIENE

A mixture of bromotrichloromethane (155 g.) and acetyl peroxide (2 g.) is placed in the bomb of the Parr apparatus. Following the procedure outlined in Example 5, the apparatus is connected to a tank of butadiene and the pressure of butadiene in the system is maintained at 31 lbs. per square inch for 4 hours during which time the temperature is maintained at 72–84° C. 69 grams of $CCl_3Br$ are recovered and the residue amounting to 102 grams is fractionally distilled yielding a mixture of the two one-to-one adducts of $CCl_3Br$ and butadiene. Product *a* has the following physical constants: $n_D^{20}$ 1.5349; B. P. 84° C. at 1.5 mm.; silver equivalent 63.34 and constitutes 80–90% of the final mixture. Product *b* which makes up the balance of the mixture of isomers has the following physical constants: $n_D^{20}$ 1.5388; B. P. 75–80° C. at 5 mm.; silver equivalent 65.0. The calculated equivalent for $C_5H_6BrCl_3$ is 63.09. When isoprene is substituted for butadiene in the above example, similar results are obtained, that is, there are two isomeric one-to-one addition products formed. The major product has the following physical properties: $n_D^{21.5}$ 1.5379; B. P. 75–78° C. at 0.5 mm.

EXAMPLE 7.—THE REACTION OF BROMOTRICHLOROMETHANE WITH PHENYLACETYLENE

A solution of phenylacetylene (47.9 g.; .47 mole) in bromotrichloromethane (470.6 gr.; 2.4 moles) is held at a temperature of 65–70° C. for 9 hours while being internally illuminated with a mercury vapor-neon fluorescent coil. The reaction mixture is distilled directly. Unreacted bromotrichloromethane is removed under vacuum and the residue weighs 86.7 g. Since this residue decomposes with an evolution of hydrogen halide upon ordinary distillation, it is molecularly distilled.

As shown in the following table, even during molecular distillation, some hydrogen bromide is removed:

*Molecular distillation of residue*

| Fraction | Weight (gr.) | $n_D^{20}$ | Molecular Weight | Silver Equivalent (Theory—75.1) |
|---|---|---|---|---|
| 1 | 2.8 | 1.5999 | 277 | |
| 2 | 15.6 | 1.6048 | 288 | |
| 3 | 14.3 | 1.6123 | 290 | |
| 4 | 21.5 | 1.6058 | 293 | 79.0 |
| 5 | 13.0 | 1.6148 | 296 | |
| 6 | 11.1 | | 354 | |
| 7 | Residue | | | |

Because of the removal of hydrogen bromide, the lower fractions are probably a mixture of trichloro-methyl phenylacetylene, and 1-phenyl-1-bromo-3,3,3-trichloro propene-1. Fraction 5, however, is almost pure 1-phenyl-1-bromo-3,3,3-trichloro propene-1 ($n_D^{20}$=1.6148); molecular weight calc'd., 300; found, 296.

The residue #7 is dissolved in boiling benzene, and the solution is treated with Norite. Upon cooling, white crystals are obtained (M. P. 188–189° C.). This substance is probably the result of the addition of two molecules of bromotrichloromethane to the phenylacetylene triple bond.

The same products are obtainable using acetyl peroxide as catalyst.

The addition of CCl$_3$Br to hexyne-1 can be similarly effected with the aid of actinic light or by the use of a diacyl peroxide.

From the foregoing it will be apparent to those skilled in the art that with the use of bromomethanes containing at least three halogen atoms one is enabled to accomplish results not attainable with other halogenated methanes.

Having thus described my invention, what I claim and desire to protect by Letters Patent is:

1. As a new composition of matter 1,1,1-trichloro-3-bromo-3-phenylpropane of the formula

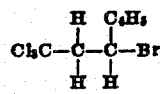

2. A compound of the formula

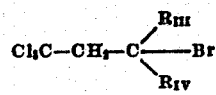

where R$_{III}$ is hydrocarbon, and R$_{IV}$ is a radical of the class consisting of hydrogen and methyl.

MORRIS S. KHARASCH.

REFERENCES CITED

The following references are of record in the file of this patent:

UNITED STATES PATENTS

| Number | Name | Date |
|---|---|---|
| 1,523,563 | Snelling | Jan. 20, 1925 |
| 2,293,772 | Soday | Aug. 25, 1942 |
| 2,410,541 | Joyce | Nov. 5, 1946 |
| 2,440,800 | Hanford et al. | May 4, 1948 |

OTHER REFERENCES

Kharasch, "Science," vol. 102, page 128 (1945).